Jan. 10, 1950 K. RATH 2,493,928
EXPOSURE DETERMINING DEVICE FOR PHOTOGRAPHIC
CAMERAS HAVING COOPERATING INDICIA
ON CAMERA AND FILM MAGAZINE
Filed April 8, 1947 2 Sheets-Sheet 2
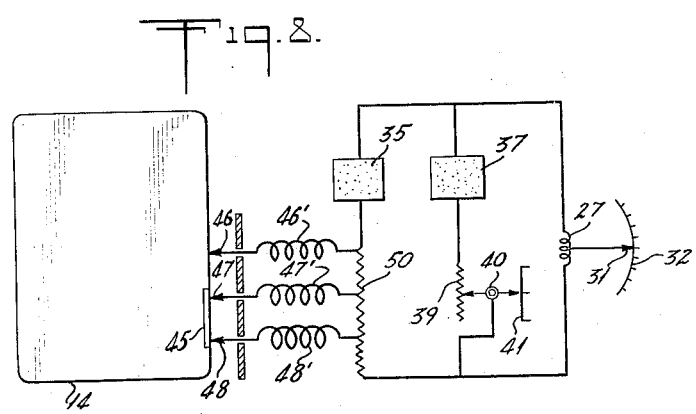
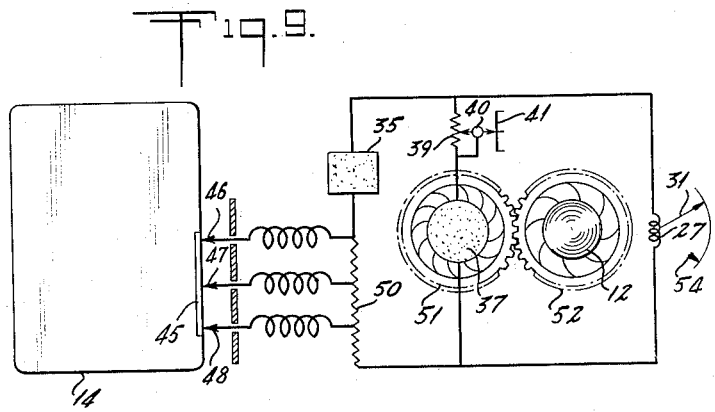
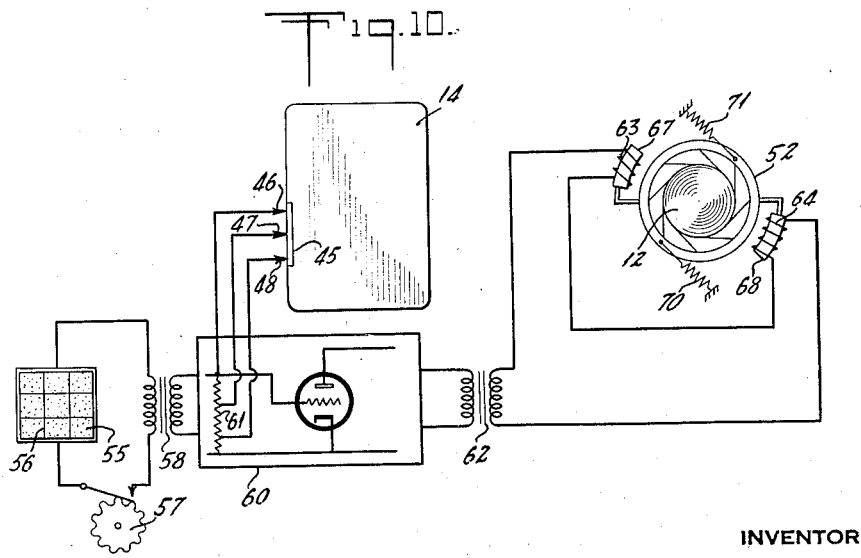
INVENTOR
BY Patented Jan. 10, 1950

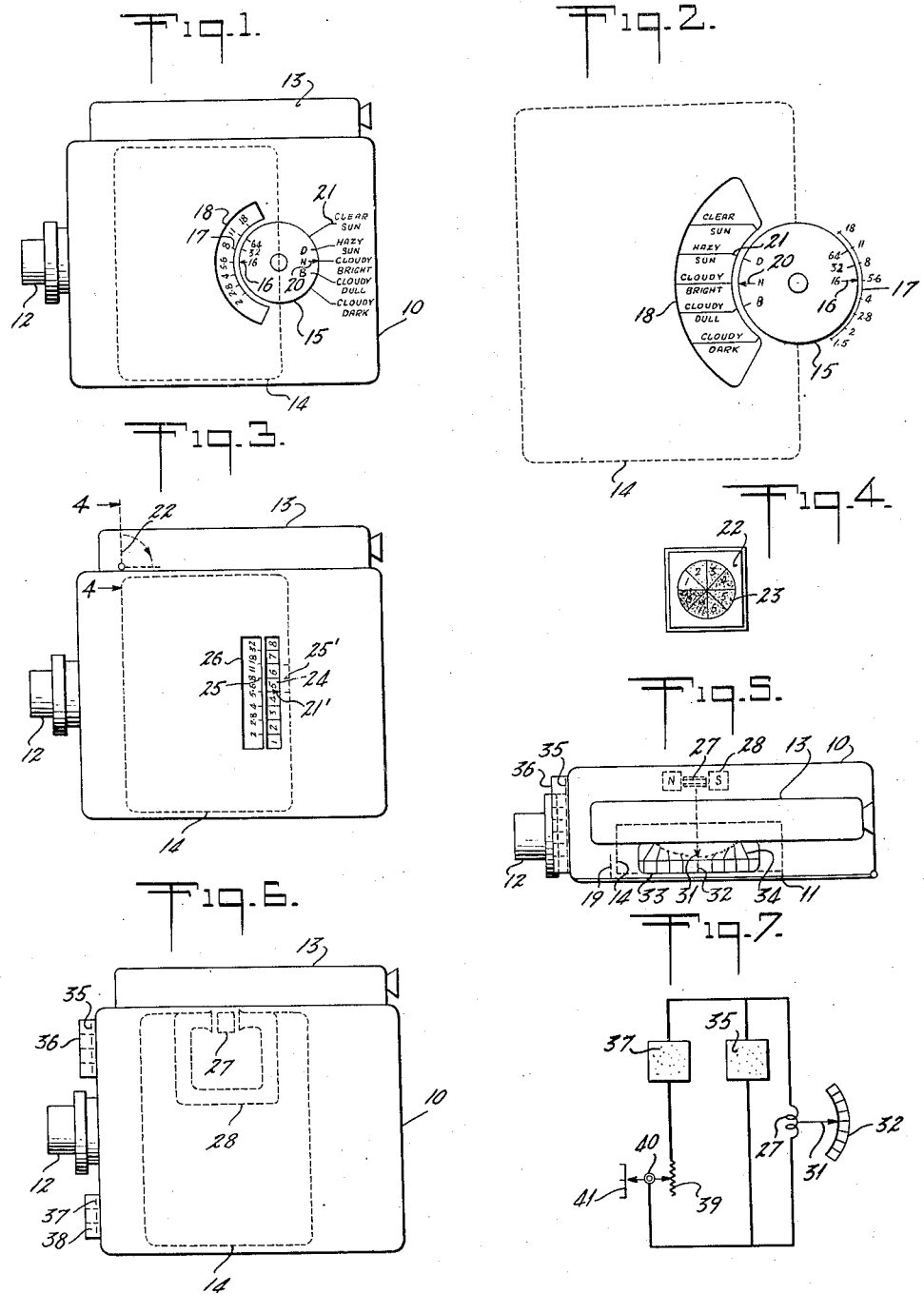

2,493,928

UNITED STATES PATENT OFFICE 2,493,928

EXPOSURE DETERMINING DEVICE FOR PHOTOGRAPHIC CAMERAS HAVING CO-OPERATING INDICIA ON CAMERA AND FILM MAGAZINE

Karl Rath, New York, N. Y.

Application April 8, 1947, Serial No. 740,054

5 Claims. (Cl. 95—10)

The present invention relates to exposure indicating or controlling devices for photographic cameras, more particularly to cameras of the magazine loading type comprising a light-proof film magazine insertable in and removable from the camera for replacing an exposed film or changing from one type of film to another, such as from black and white to color film and vice versa, before completely exposing a film roll. Such magazine loading not only results in substantial simplification of the operation of both motion picture and still cameras, but prevents leakage of light and consequent edge fogging experienced with the usual open or paper backed film rolls, while at the same time enabling a rapid change from one type of film to another type to suit the character of the scene or object or other requirements.

In changing from one type to another type of film, it is necessary to make a correction in the exposure determination or control in order to consider the difference in sensitivity or speed of the various types of film used. If an exposure table or meter is used mounted upon the camera, the same has to be reset to correspond to the changed film speed each time a magazine is exchanged for another containing a different type of film. This adjustment may be easily overlooked, especially when speed in taking a picture is required, thus resulting in a wrongly exposed and eventually completely lost and irreplaceable picture.

Accordingly, an object of the present invention is the provision of simple means for magazine loading cameras provided with a built-on or built-in exposure indicator or control device, whereby insertion of the magazine into the camera will automatically effect a change or adjustment in the indicator or control device to take into account different film speeds substantially without any manual operations or adjustments required on the part of the operator. In other words, the personal element is completely eliminated by the invention, resulting both in substantial simplification of the operation of the exposure indicator or control device as well as in correct exposure results irrespective of the type of film used.

The above and further objects and novel aspects of the invention will become more apparent from the following detailed description taken in reference to the accompanying drawings forming a part of this specification and wherein:

Figure 1 shows schematically a side view of a magazine loading type motion picture camera embodying an exposure guide constructed in accordance with the principles of the invention;

Figure 2 is a fractional view of Figure 1, showing a modification of the invention;

Figure 3 shows a camera similar to Figure 1, embodying a separate light meter and conversion device constructed in accordance with the principles of the invention;

Figure 4 is a partial view taken on line 4—4 of Figure 3;

Figure 5 is a top view and Figure 6 is a side view of a camera embodying a direct reading exposure meter constructed in accordance with the invention;

Figure 7 is a circuit diagram showing the connection of the photo-electric cells and meter in Figure 6;

Figure 8 is a diagram showing a modification of a direct reading exposure meter for magazine loading cameras in accordance with the invention;

Figure 9 is a diagram showing still another modification of the invention embodied in a semi-automatic exposure control system; and Figure 10 shows a diagram of a fully automatic exposure control arrangement embodying the improvement according to the invention.

Like reference numerals identify like parts throughout the different views of the drawings.

Referring to Figure 1, there is shown schematically a magazine loading type motion picture camera comprising a body or housing 10 provided with a door or removable cover 11, a lens 12 and a view-finder 13, all of which may be of conventional construction well known in the art. Item 14 represents a film magazine containing in a known manner film supply and take-up spools and a window for exposing the film by the lens 12 in the inserted position of the magazine. Magazine loading cameras of this type are well known in the art and the conventional details, like the coupling mechanism connecting the magazine with the driving means of the camera as well as the film advancing means cooperating with the film perforations have been omitted from the drawing for simplicity of illustration and as being unnecessary for the understanding of the present invention. Suffice it to say, that magazine loading cameras have the advantage of enabling a quick loading and unloading without having to thread the film around sprockets and other guides, whereby to make it possible to quickly interchange one type of film for another in a manner well known. This applies both to motion picture cameras and to still cameras, as is understood.

The camera illustrated in Figure 1 is provided with an exposure table or guide comprising, in the example shown, a rotatable disc or scale member 15 mounted upon the outside of the camera and provided with a first scale 16 having graduations representing frames per second in case of a motion picture camera or exposure times in case of still cameras. Scale 16 is arranged for cooperation with a scale 17 of aperture or f-stop numbers applied to the film magazine 14 and being visible through an opening or window 18 in the wall of the camera.

The scale member 15 is provided with a further scale 20 having a series of graduations representing, in the example shown, the type of subject, such as dull, normal or bright subjects characterized by the letters D, N and B, respectively, in the drawing and arranged to cooperate with a fixed or stationary scale 21 of general light conditions applied to or otherwise arranged upon the outside surface of the camera. In use, the photographer adjusts the disc 15 so that the graduation representing the type of subject on scale 20 is opposite to the graduation representing the existing light condition on scale 21, such as Clear sun, Hazy sun, Cloudy bright, Cloudy dull, and Cloudy dark as shown in the example illustrated, whereupon the correct f-stop may be directly read in the window 18 opposite the exposure time or frame number, such as the number 16 corresponding to the standard number of frames per second for the average amateur motion picture camera. If the magazine 14 is exchanged for another magazine containing a film of different speed, the different scale 17 upon the new magazine will automatically result in the correct aperture or f-stop reading, substantially without any further adjustment or consideration on the part of the photographer. In this manner, the operation and use of the exposure guide is greatly simplified and loss of film substantially reduced.

A further advantage of an arrangement of the above type for automatically considering film speed in magazine loading cameras is due to the fact that no change whatsoever is required in the mechanical construction of the camera or magazines, so that existing magazines can be used without change in design by merely providing thereon appropriate exposure scales by printing, engraving pasting or in any other suitable manner, as will be readily understood.

In order to prevent light, entering the window 18 advantageously covered by a plate of glass, Lucite or the like, from entering the camera dark chamber between the film gate and the lens, a suitable light trap may be provided such as in the form of a simple guard or plate 19 as shown in Figure 5, to prevent a direct or straight light path between the window 18 and lens chamber, in a manner well known and understood by those skilled in the art. As is furthermore understood, the scale of light conditions 21 and f-stop scale 17 may be interchanged as shown in Figure 2, in which case setting of one of the subject marks opposite the existing light condition appearing in the window 18 will result in the indication of the correct f-stop opposite to the proper marks of scale 16.

Referring to Figure 3, there is shown an arrangement similar to that according to Figure 1 including a separate extinction type light gauge in the form of a transparent or translucent element 22 provided with an optical wedge 23 as shown more clearly in Figure 4 and comprising a series of adjacent circularly arranged areas of successively increasing density. Each of said areas has a different number superimposed thereon in any suitable manner well known. The wedge or light gauge is advantageously mounted in the view finder 18 as indicated in dotted lines in Figure 3 so as to normally lie against the bottom of the finder to prevent interference with the proper operation thereof, and being movable into a position at right angle to the light path in the finder for carrying out a light intensity reading. As is well known, all that is necessary for this purpose is to determine the number of the wedge 23 which is just barely visible, this number being proportional to the existing scene or object brightness, provided the camera is properly aimed in the direction of the object to be photographed.

The light scale on the wedge 23 is repeated upon the calculator or conversion device mounted upon the camera, as shown at 24 in the drawing. Scale 24 applied to the outside of the camera cooperates with the f-stop scale 25 arranged upon the magazine 14 and being visible through the window 26, in substantially the same manner as in Figure 1. All that is necessary in this case, after the proper light value has been ascertained by reading the light gauge in the view finder, is to read the f-stop on scale 25 opposite to the light value read and on scale 24. By subsequently setting the aperture of lens 12 to correspond to the value read on scale 25, a correct exposure will be insured for an existing scene or object brightness. In order to consider different numbers of frames per second or exposure times, scale 24 may be adjustable and provided for this purpose with a mark or index 24' arranged to cooperate with a further fixed scale 25' representing exposure times and applied to the camera casing.

Thus, varying frame speeds will be automatically considered by the provision of suitably staggered aperture scales 25 upon the different film magazines corresponding to the different types or speeds of film, as is understood. In place of an extinction type light gage or meter shown for illustrative purposes, any other type of light meter such as a photo-electric meter may be used in connection with the calculator shown in Figure 3.

Referring to Figures 5, 6 and 7, there is shown a direct reading type of exposure indicator for magazine loading cameras embodying the improvement according to the invention. The pointer 31 of the light meter is arranged to cooperate directly with the different exposure scales upon the film magazines in the inserted or loaded position. There is shown for this purpose an electrical instrument having a magnetic moving coil 27 pivotally mounted between the poles N and S of a permanent magnet 28 and carrying the pointer or needle 31. The latter cooperates directly with the f-stop scale 32 applied to the edge surface of the film magazine 14, both said scale and pointer being visible through a window 33 in the top wall of the camera housing 10. In order to correlate a linear f-stop scale 32 with a non-linear pointer scale, suitable guide lines 34 are shown connecting on ends of the pointer positions with the graduations of scale 32, in a manner well-known in the design of photo-electric exposure indicators.

The moving coil 27 of the electrical instrument is directly connected to a photoelectric cell 35 of the self-generating type, as shown in Figure 7, said cell being provided with a suitable grille or light baffle 36 to restrict the light rays to a limited angle corresponding to the picture or field angle of the lens 12 and mounted upon the front wall of the camera body above lens in the example shown. In order to consider different numbers of frames per second or exposure times, a further photo-electric cell 37 mounted below the lens 12 and having a light baffle 38 is shown connected in parallel to the cell 35 in series with a resistance 39 adjustable in accordance with scale 41 calibrated in exposure times or any other exposure determining factor by means of an adjusting member 40, in a manner as described in greater detail in my Patent No. 2,354,544.

Figure 8 shows a modification of a direct reading exposure indicator of the type according to Figures 5 to 7, wherein the magazine 14 in place of carrying an exposure scale is utilized to short-circuit varying portions of an electrical resistance, depending upon the particular film speed, said resistance being arranged to affect the sensitivity of the exposure indicator. In this case, the meter may be mounted at any suitable place of the camera and a special viewing window will be dispensed with.

Substantially the same electrical circuit is shown as in Figure 6 including a resistance 50 in series with the photoelectric cell 35. Varying portions of this resistance are automatically short circuited upon insertion of the film magazine 14 into the camera by the provision upon said magazine of a contact strip or member 45 of varying length, depending upon the speed of the particular film in the magazine. There are furthermore provided a plurality of contacts, three being shown in the example, illustrated at 46, 47 and 48 and mounted upon springs 46', 47' and 48', respectively. Contacts 46, 47 and 48 are connected to suitable points of the resistance 50. Accordingly, upon insertion of the film magazine 14 into the camera, two or more of the contacts will be short circuited by the contact member 45, depending upon the length of the latter, i. e., the speed or sensitivity of the particular film contained in the magazine.

In Figure 8, the contact member 45 upon the magazine 14 is shown to short circuit contacts 48 and 47, resulting in the short circuit of the central section of the resistance 50. In Figure 9, the contact member 45 short circuits all three contacts 46, 47 and 48, thus resulting in the short circuit of both the central and upper sections of resistance 50. In this manner, three variations of the resistance 50 are obtained, corresponding to three different film speeds such as a low, medium and high film speed. The smaller the resistance 50, the greater the contribution of the photo-cell 35 to the total current energizing the indicator coil 27 and the greater will be the sensitivity of the latter. Consequently, more and more resistance should be inserted in series with the photocell 35 as the film speed is increased, as will be understood.

In the example shown according to Figure 8, the scale 32 of the current indicator may be calibrated in f-stops, while varying numbers of frames may be taken into account by adjusting the resistance 39 in series with the photoelectric cell 37. If the arrangement is used in connection with a still camera, scale 41 may represent exposure times, or scales 41 and 32 may be interchanged as is readily understood.

Referring to Figure 9, there is shown by way of example a semi-automatic exposure control system embodying the principle of the invention. The magazine-operated contacts 46, 47 and 48, fixedly mounted within the camera, and the resistance 50 are substantially the same as in Figure 8. The photoelectric cell 35 is again connected to the moving coil 27 of the indicator in series with a resistance 50, while the photoelectric cell 37 is shown provided with an adjustable iris diaphragm 51 or equivalent light control element which is positively coupled with the diaphragm adjusting member 52 of the lens 12 of the camera. The meter dial in this case is provided with only a single index or fiduciary mark 54 and the design and adjustment of the various circuit elements is such that operation of the lens diaphragm 52 to a point where the pointer 31 coincides with the mark 54, which may be located directly in the field of the view finder 13, will result in the proper f-stop adjustment for the lens 12 to insure a correctly exposed picture under the existing scene or subject brightness conditions. Varying numbers of frames/second or exposure times may be considered by controlling the photoelectric current contributed by the cell 37 by means of the adjustable resistance 39, in substantially the same manner as in the previous illustrations.

Finally, there is shown in Figure 10 an arrangement according to the invention embodied in a fully automatic exposure system. For this purpose, the current of the photoelectric cell 55 provided with a suitable grille 56 or other acceptance angle limiting means, is periodically interrupted by means of a chopper or current interrupter 57 and stepped up by means of a transformer 58 to a voltage sufficient for energizing a standard electron tube miniature audio amplifier collectively shown at 60 of the type used in hearing aids, portable pocket radios or the like. The amplifier 60 includes a volume or gain control resistance 61 associated therewith in a known manner and arranged to be variably short circuited by the film magazine 14 in substantially the same manner described hereinabove, whereby to result in a varying amplifying alternating current in the secondary winding of the output transformer 62. The latter is connected to an electric iris control of the camera. This control in the example shown is of specific type, comprising a pair of solenoids 63 and 64 mounted at opposite sides of the diaphragm adjusting member 52 of the lens 12. The adjusting member 52 carries a pair of magnetic plungers 67 and 68 and is normally urged into a limit position, viz., the fully open position in the example shown, by means of a pair of balancing springs 70 and 71. In this manner, a gradual increase of the output current of the amplifier corresponding to the scene or object brightness affecting the photoelectric cell 5, will result in the plungers 67 and 68 being drawn into the solenoids 63 and 64 in such a manner as to adjust the diaphragm opening in inverse proportion to the scene or object brightness.

If desired, the solenoids 63 and 64 in Figure 10 may be energized by direct current by the provision of a suitable rectifier for converting the alternating output current into direct current. Furthermore, both solenoids may be connected in parallel instead of in series as shown, or a single solenoid and plunger may be provided if desirable. The interrupter or amplifier may be directly built in the camera or may form a separately wearable unit connectable to the camera through flexible conductors in the manner more clearly described in my Patent No. 2,412,424. In the case of a motion picture camera, the interrupter 51 may be advantageously operated by the motor driving the film advancing and claw mechanism.

While there have been shown and described in the foregoing a few desirable embodiments of the invention, it is understood that this disclosure is for the purpose of illustration and that various changes in shape, proportion and arrangement of parts, as well as the substitution of equivalent elements for those herein shown and described may be made without departing from the spirit and scope of the invention, as defined by the appended claims. The specification and drawings are accordingly to be regarded in an illustrative rather than a limiting sense.

I claim:

1. The combination with a magazine loading photographic camera comprising a light-proof film magazine insertable in and removable from said camera, of exposure indicating means comprising scale means upon said magazine representing exposure controlling indicia for said camera, said camera being provided with a window to reveal said indicia in the inserted position of magazine, and further index means representative of light conditions and arranged upon the outside of said camera adjacent to said window and in cooperative relation with said exposure indicia, whereby to complementarily form a complete exposure indicator by said scale and index means.

2. The combination with a magazine loading photographic camera comprising exposure adjusting means and a light-proof film magazine insertable in and removable from said camera, of exposure indicating means comprising scale means upon said magazine having indicia representing light values, said camera being provided with a window to reveal said indicia in the inserted position of said magazine, and further index means representative of exposure adjusting values and arranged upon the outside of said camera adjacent to said window in cooperative relation with said indicia, to complementarily form a complete operative exposure indicator by said scale and index means.

3. The combination with a magazine loading photographic camera comprising exposure adjusting means and a light-proof film magazine insertable in and removable from said camera, of means for indicating coordinated exposure adjusting values for varying light values, comprising scale means upon said magazine having indicia representing one of said values, said camera being provided with a window to reveal said indicia in the inserted position of said magazine, and further index means representative of the other of said values and arranged upon the outside of said camera adjacent to said window in cooperative relation with said indicia, to complementarily form a complete operative exposure indicator by said scale and index means.

4. The combination with a magazine loading photographic camera comprising exposure adjusting means and a light-proof film magazine insertable in and removable from said camera, of exposure indicating means comprising an adjustable member upon the outside of said camera, a first pair of cooperating indicia, one of said indicia being arranged upon said magazine and the other indicia being arranged upon said member, said camera being provided with a window adjacent to said last mentioned indicia to reveal the cooperating indicia upon said magazine in the inserted position in the camera, a second pair of cooperating indicia, one of said last indicia being arranged upon the outside of the camera and the other of said last indicia being arranged upon said member, at least one indicia of one of said pairs representing light values and at least one indicia of the other of said pairs representing exposure adjusting values for said camera, whereby to complementarily form a complete operative exposure indicator by both said first and second pairs of indicia.

5. The combination with a magazine loading photographic camera comprising exposure adjusting means and a light-proof film magazine insertable in and removable from said camera, of exposure indicating means comprising first and second scale means, one of said scale means representing light values and the other scale means representing exposure adjusting values for said camera, said first scale means being provided upon said magazine and being visible through a window in the wall of said camera in the inserted position of said magazine and said second scale means being provided upon the outside of said camera, an adjustable member mounted upon the outside of said camera, first and second index means upon said member, said first index means being arranged adjacent to and cooperating with said second scale means and said second index means being arranged adjacent to said window and in cooperative relation with said first scale means upon said magazine, whereby to complementarily form a complete operative exposure indicator by both said first and second scale and index means.

KARL RATH.

REFERENCES CITED

The following references are of record in the file of this patent:

UNITED STATES PATENTS

| Number | Name | Date |
|---|---|---|
| 2,043,901 | Mihalyi | June 9, 1936 |
| 2,080,055 | Martin | May 11, 1937 |
| 2,186,611 | Martin | Jan. 9, 1940 |
| 2,217,036 | Williams | Oct. 8, 1940 |
| 2,252,573 | Leitz et al. | Aug. 12, 1941 |
| 2,256,208 | Leitz et al. | Sept. 16, 1941 |
| 2,278,338 | Tonnies | Mar. 31, 1942 |
| 2,282,051 | Helbing et al. | May 5, 1942 |
| 2,421,476 | Belar et al. | June 3, 1947 |